July 21, 1959  D. E. THOMAS  2,896,168
TRANSISTOR CHARACTERISTIC CURVE TRACERS
Filed March 18, 1954  4 Sheets-Sheet 1

INVENTOR
D. E. THOMAS
BY R. B. Ardis
ATTORNEY

July 21, 1959     D. E. THOMAS     2,896,168
TRANSISTOR CHARACTERISTIC CURVE TRACERS
Filed March 18, 1954     4 Sheets-Sheet 2

INVENTOR
D. E. THOMAS
BY R. B. Ardis
ATTORNEY

INVENTOR
D. E. THOMAS
BY R. B. Ardis
ATTORNEY

July 21, 1959    D. E. THOMAS    2,896,168
TRANSISTOR CHARACTERISTIC CURVE TRACERS
Filed March 18, 1954    4 Sheets-Sheet 4

INVENTOR
D. E. THOMAS
BY
R. B. Ardis
ATTORNEY

United States Patent Office 2,896,168
Patented July 21, 1959

2,896,168

TRANSISTOR CHARACTERISTIC CURVE TRACERS

Donald E. Thomas, Madison, N.J., assignor to Bell Telephone Laboratories, Incorporated, New York, N.Y., a corporation of New York Application March 18, 1954, Serial No. 416,973

14 Claims. (Cl. 324—158)

This invention relates generally to transistor circuits and more particularly, although in its broader aspects not exclusively, to circuits for the measurement of the electrical parameters of transistors.

A principal object of the invention is to stabilize the D.-C. operating point of certain types of transistors.

Another and more particular object is to permit the measurement of transistor parameters under stable conditions at all times, regardless of the type of transistor.

A related object is to permit the measurement of the parameters of VHF point-contact transistors under stable conditions at all times.

A further object is to avoid unstable conditions in the measurement of transistor parameters due to negative resistance regions in the collector characteristics of the transistor under test.

Still another object is to avoid relaxation oscillations in the measurement of transistor parameters without introducing inaccuracies into emitter voltage measurements.

For purposes of analysis, a transistor is often considered as a four-terminal active network, and a number of useful equivalent circuits have been devised and related to the four-pole impedances. In order to make use of these equivalent circuits in practical circuit design problems, it is usually necessary to determine the numerical values of the impedances which appear in the equivalent circuits. Much equipment has been designed to measure these transistor parameters, some by direct reading methods and some by methods which include displaying dynamic or static transistor characteristics on a chart or on the screen of a cathode-ray oscilloscope.

While existing equipment is, for the most part, satisfactory for measuring the parameters of most early transistors, some transistors such as the more recently developed VHF point-contact transistors introduce measuring difficulties. In the measuring equipment found in the prior art, instabilities of several varieties tend to interfere with the measuring process and even to endanger the transistor itself. As a result, such VHF units could heretofore only be evaluated on the basis of their performance in specific circuits. It has, in general, been impossible to characterize many of them independently of external circuits.

The present invention makes it possible to measure the various electrical parameters of virtually all types of transistors under stable conditions with no danger to the transistors themselves. In accordance with a principal feature of the invention, a bias supply of the constant-voltage type is used to supply the collector operating potential to the transistor under test, while a bias supply of the constant-current type is used to supply the emitter operating potential. This represents a considerable departure from the prior art, in which bias sources of the constant-current type were used to supply both emitter and collector operating potentials, and avoids instability which might otherwise be caused by negative resistance regions in the collector characteristics of the transistor under test.

The present invention also features a capacitor connected immediately adjacent the transistor under test between the collector and base electrodes. This capacitor, by keeping the impedance presented to the collector electrode by the biasing source low at high frequencies, assures stability by insuring that that source remains a substantially constant voltage source throughout the range of frequencies in which the transistor has gain.

Still another feature of the invention provides for the stabilization of the transistor under test against relaxation oscillations and still permits accurate measurement of the voltage between the emitter and base electrodes. In accordance with this feature, a resistance at least several times larger than the internal emitter and base resistances of the transistor is connected immediately adjacent the transistor between the emitter electrode and the emitter biasing source, and another similar resistance is connected immediately adjacent the transistor between the emitter electrode and a terminal at which the transistor emitter voltage may be measured. The combination of these two resistances stabilizes the transistor against relaxation oscillations caused by a combination of greater than unity $\alpha$, positive feedback through the internal transistor base resistance, high frequency response, and emitter-to-ground capacity; and the presence of the second resistance permits the measurement of emitter voltage without error caused by the flow of emitter current through the first.

Additional objects and features of the invention will appear upon consideration of the following detailed description of several specific embodiments and the advantages which they possess over typical measuring systems of the prior art. In the drawings.

One of the earliest things learned about a point-contact transistor was that it was short-circuit unstable. In order to avoid this instability, it was the general practice to use high impedance, constant-current biasing sources for both the emitter and collector of the transistor and to use high impedance constant-current signal generators in measuring the transistor. This naturally led to a description of the transistor in terms of its open-circuit impedances. The now well-known equivalent circuit resulting from this approach to the problem of describing the electrical characteristics transistor is given in Fig. 1, where $r_e$ is the internal emitter resistance of the transistor, $r_b$ is the internal base resistance of the transistor, $r_c$ is the internal collector resistance of the transistor, $r_m$ is the so-called mutual resistance of the transistor, $i_e$ is the A.-C. emitter current, $I_e$, $V_e$, $I_c$ and $V_c$ are the input current and voltage and the output current and voltage respectively, which, as complex functions of frequency, completely specify the steady state performance of the device as a network.

Figure 1:
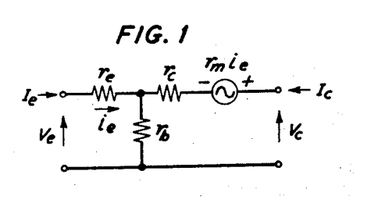
Figs. 1 and 2 are transistor equivalent circuits which are often used in the design of practical transistor circuits.

The equivalent circuit resistances $r_e$, $r_b$, $r_c$ and $r_m$ in terms of the open circuit resistances $r_{11}$, $r_{12}$, $r_{22}$, and $r_{21}$ and the definitions of these individual four terminal network open circuit resistances are as follows:

$$r_e = r_{11} - r_{12} \quad (1)$$

$$r_b = r_{12} \quad (2)$$

$$r_c = r_{22} - r_{12} \doteq r_{22} \quad (3)$$

$$r_m = r_{21} - r_{12} \doteq r_{21} \quad (4)$$

$$r_{11} = \frac{\partial V_e}{\partial I_e}\bigg]I_c = \text{constant} \quad (5)$$

$$r_{12} = \frac{\partial V_e}{\partial I_c}\bigg]I_e = \text{constant} \quad (6)$$

$$r_{22} = \frac{\partial V_c}{\partial I_c}\bigg]I_e = \text{constant} \quad (7)$$

$$r_{21} = \frac{\partial V_c}{\partial I_e}\bigg]I_c = \text{constant} \quad (8)$$

Figure 2:
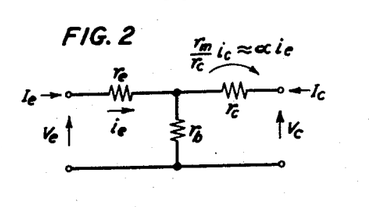

In their early paper, "Some Circuit Aspects of the Transistor," appearing at page 367 of the July, 1949, issue of The Bell System Technical Journal, Ryder and Kircher pointed out that although this description of the transistor was convenient, it was neither final nor unique and that, in fact, as soon as the higher frequency performance of transistors became of interest, one of the other possible descriptions would be made convenient. This description involved the substitution of a current generator, $\alpha i_e$, for the voltage generator, $r_m i_e$, in the collector circuit as shown in Fig. 2. The definitions of the dimensionless constant $\alpha$ are as follows:

$$\alpha = -\frac{\partial I_c}{\partial I_e}\bigg]V_c = \text{constant} \quad (9)$$

$$\alpha = \frac{r_m + r_b}{r_c + r_b} \doteq \frac{r_{21}}{r_{22}} \quad (10)$$

It is of interest to note that one of the elements of the equivalent circuit in Fig. 2 is defined in terms of a constant collector voltage or, in other words, a short-circuit collector termination. This is permissible without violating the well-known low frequency criterion of stability since the source of potential short-circuit instability in transistors is positive feedback through the internal base resistance of the transistor. This feedback can be reduced to a low stable value by high impedance in the emitter regardless of the value of the impedance in the collector, or vice versa. Actually, if high impedance across the entire frequency band at which the transistor has gain is used in both the emitter and collector, the transistor may be unstable due to feedback through the emitter to collector capacitance.

Practically all early transistor measurement equipment was designed to measure the four open-circuit parameters defined in Equations 5 through 8 and the single combination open-circuit short-circuit parameter defined in Equation 9. Since early models of transistors had relatively low frequency cut-offs, it was not necessary to give important consideration to lead impedances and parasitic shunt capacitances. Even in the short-circuit collector measurement of $\alpha$, the collector was intentionally short-circuited only at the measuring frequency. High impedance constant current D.-C. collector bias was still used, and measurements, rather than stability considerations, determined the collector terminating impedance at frequencies different from the measuring frequency.

It should be noted, at this point, that an ideal constant-current generator would have infinite impedance, while an ideal constant-voltage generator would have zero impedance. However, to be effectively constant current, a generator need only have an impedance high enough relative to the impedance of the load it is driving that the load impedance has only a second order effect on the current which flows in the circuit. Similarly, a constant-voltage generator need only have an impedance low enough relative to its load that the load impedance has only a second order effect on the voltage across the circuit. In other words, the impedance of a constant-current source may be said to be many times greater than the impedance of the load it is driving, while that of a constant-voltage source may be said to be many times less. In all discussions to follow, these latter definitions are descriptive of what is meant when reference is made to a constant-current or constant-voltage generator.

When point-contact transistors having alpha cut-off frequencies in the VHF region were developed, they proved to be unstable in practically all of these early designs of measuring equipment. A complete re-evaluation of stability requirements has therefore been necessary in order to modify old and to construct new measuring equipment suitable for characterizing these higher frequency units.

Figure 3A:
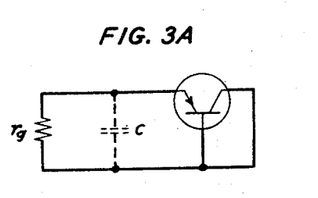
Figs. 3A and 3B show a transistor circuit in which relaxation oscillations may be present under conditions favorable to them.
Figure 3B:
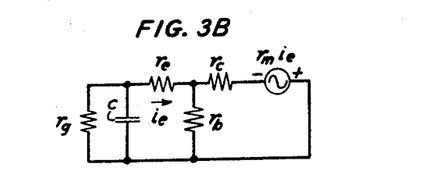

In order to provide a foundation for an understanding of the present invention, consideration should first be given to modifying the well-known low frequency requirement for stability of transistors by taking into account parasitic capacitances and the frequency characteristic of the alpha current gain of the transistor. The circuit chosen for this evaluation is given in Fig. 3A. A short-circuit collector is chosen since, with proper emitter-to-collector shielding to keep emitter-to-collector capacitance small, this is the most severe condition with respect to relaxation oscillations. C represents the sum of the parasitic emitter-to-collector and emitter-to-ground capacitances of the transistor plus any residual capacitance due to external wiring, sockets, and the like. $r_g$ is the internal impedance of the generator driving the transistor emitter. The equivalent circuit of the circuit of Fig. 3A is given in Fig. 3B. The circuit determinant of the circuit of Fig. 3B, written in terms of the complex variable $p = j2\pi f$, is:

$$\Delta = \begin{vmatrix} r_g + \frac{1}{pC} & -\frac{1}{pC} & 0 \\ -\frac{1}{pC} & r_e + r_b + \frac{1}{pC} & -r_b \\ 0 & -r_b - \frac{\alpha_0 r_e}{1 + \frac{1}{2\pi f_c p}} & r_e + r_b \end{vmatrix}$$

$$= \frac{r_g C^2}{2\pi f_c}[r_e r_c + r_e r_b + r_c r_b]p^3 + \left[r_g C^2(r_e r_c + r_e r_b + r_c r_b) \right.$$
$$\left. + \frac{C}{2\pi f_c}(r_e r_e + r_e r_b + r_b r_c) + \frac{r_g C}{2\pi f_c}(r_c + r_b) - r_e r_b r_g C^2 \alpha_0\right]p^2$$
$$+ [C(r_e r_e + r_e r_b + r_b r_e + r_e r_c + r_e r_b - \alpha_0 r_e r_b)]p$$

(11)

where $\alpha$, which is very close to being equal to $$\frac{r_m}{r_c}$$

is given as a function of frequency by:

$$\alpha = \frac{\alpha_0}{1 + j\frac{f}{f_c}} = \frac{\alpha_0}{1 + \frac{p}{2\pi f_c}} \quad (12)$$

In Equation 12:

$\alpha_0$ = the low frequency magnitude of $\alpha$
$f_c$ = the alpha cut-off frequency, i.e., the frequency at which the magnitude of $\alpha$ is down 3 db from its low frequency value.

It can be shown that the circuit under consideration will be stable if all the $p$ coefficients in the determinant given in (11) are positive. Since, under the conditions assumed, the $p^3$ coefficient is always positive, it is only required that the circuit elements be such that the $p^2$ and $p$ coefficients are positive. For the circuit to be stable, therefore, the following two conditions must be met:

$$\alpha_0 < 1 + r_e\left(\frac{1}{r_b}+\frac{1}{r_e}\right)+\frac{1}{2\pi f_c r_e C}\left[1+(r_e-r_s)\left(\frac{1}{r_b}+\frac{1}{r_e}\right)\right] \quad (13)$$

and $$\alpha_0 < 1 + (r_e+r_s)\left(\frac{1}{r_b}+\frac{1}{r_e}\right) \quad (14)$$

If it is assumed that $r_g >> r_e$, $r_g >> r_b$, and $r_c >> r_b$, then the two requirements for stability become:

$$\alpha_0 < 1 + \frac{r_e}{r_b} + \frac{1}{2\pi f_c r_b C} \quad (15)$$

and $$\alpha_0 < \frac{r_g}{r_b} \quad (16)$$

Since it has been assumed that $r_g >> r_b$ and since $\alpha$ is usually of the order of magnitude of three or less throughout most of the operating band of point-contact transistors, the second condition is satisfied. However, since $r_e/r_b$ is usually less than unity, the requirement of (15) places a minimum permissible value on $$\frac{1}{2\pi f_c r_b C}$$

below which the circuit is unstable for transistors having an $\alpha$ of two or above. This places a maximum permissible value on the product $f_c r_b C$ which cannot be exceeded if stability against relaxation oscillations is to be assured.

In order to produce point-contact transistors with alpha cut-off frequencies in the VHF region, it is generally necessary to utilize very close point spacings. Base resistance, however, tends to increase rapidly as point spacing is decreased. Therefore, in spite of the fact that low resistivity germanium can be used to counteract this tendency of base resistance to rise, the base resistances of VHF point-contact transistors tend to be somewhat higher than those of lower frequency units. Thus, as $f_c$, the alpha cut-off frequency, is increased $r_b$ also increases. It is not surprising, therefore, that in many equipments designed when alpha cut-off frequencies were relatively low, the $f_c r_b C$ product for VHF point-contact transistors exceeds the maximum value permissible for stability, as determined by Equation 15, and that the transistor oscillates in the measuring circuit.

In accordance with one feature of the invention, this problem is solved by a compartively simple circuit modification. Since constant-current emitter bias and signal sources are used to supply the emitter in each of the point-contact measurements so far defined, a resistance at least several times larger than $r_e$ and $r_b$ is placed in the emitter input circuit. The physical position of this resistance is as near as possible to the emitter electrode of the transistor in order to assure that the capacitance C is as small as possible, as determined by the parasitic capacitance of the transistor itself.

This resistance is shown in the embodiment of the invention illustrated in Fig. 8A, which will be described in due course, by the resistance 24. With one exception, all other necessary connections are made to the side of resistance 24 away from the emitter and are thereby isolated from the emitter. As shown by the definitions of Equations 5 through 9, it is usually necessary to measure the emitter potential in making transistor parameter measurements. In order to avoid the error due to emitter current flowing in resistance 24 which would occur if the potential were taken at terminal 33, a second resistance 31 is connected directly to the emitter terminal to provide a potential terminal 32. Since this is a potential terminal, the voltage drop across resistance 31 is either negligible or requires at most only a small correction to the emitter potential calibration. The resistances 24 and 31 in parallel now correspond to the resistance $r_s$ of the stability solution of Equation 15 and their parallel value should, therefore, be at least several times larger than both $r_e$ and $r_b$ of the transistor.

Figure 4A:
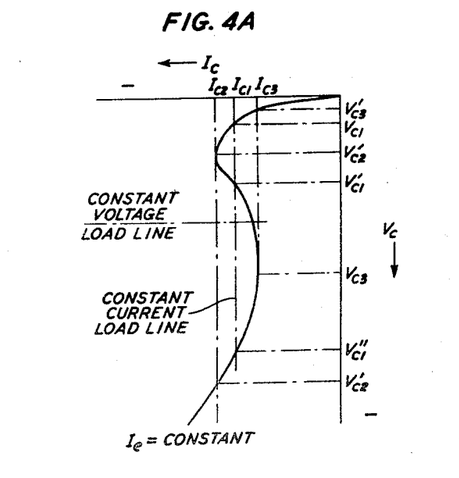
Figs. 4A and 4B illustrate the collector characteristics of a VHF point-contact transistor having a negative resistance collector region.
Figure 4B:
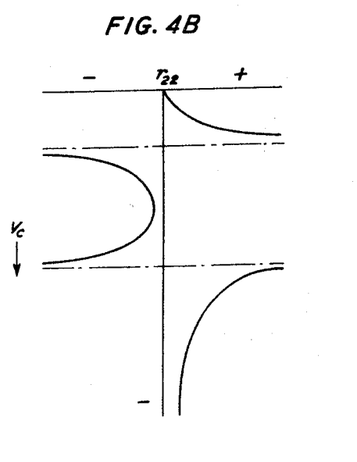

Even after steps were taken in accordance with the above-described feature of the invention to stabilize measuring equipment against relaxation oscillations caused by parasitic emitter-to-ground capacitances, many point-contact transistors—even some with quite low frequency cut-offs—were still unstable in the modified measuring sets. Applicant has discovered that the reason for this is negative resistance regions in the $r_{22}$ or collector resistance characteristics of the transistors involved. Such a negative resistance region is illustrated in the plot of $I_c$ versus $V_c$ with $I_e$ constant given in Fig. 4A. The slope of this curve at any point is, by definition, the resistance $r_{22}$, which is substantially the same as $r_c$, the collector resistance. $r_{22}$ is plotted qualitatively in Fig. 4B as a function $V_c$. As illustrated, there is a wide region of $V_c$ where the collector resistance is negative. If a constant current or infinite impedance load line is drawn on the $I_c$—$V_c$ characteristic of Fig. 4A, it can be seen that for certain values of $I_c$ (such as $I_{c1}$), the load line intersects the curve at more than one point. This means that if a constant-current collector bias is supplied to the transistor represented by this collector characteristic, there are three different collector voltages, $V_{c1}$, $V_{c1}'$, and $V_{c1}''$, which are possible for the single collector current $I_{c1}$. It is possible, therefore, as $I_c$ is increased under the control of a constant-current bias supply, to have the collector voltage snap between $V_{c1}$, $V_{c1}'$, and $V_{c1}''$." A transistor having this type of $V_c$—$I_c$ characteristic is said to be open-circuit collector unstable in the region where $V_c$ is multivalued for a single value of $I_c$. Once the current increases to $I_{c2}$ under the control of a constant-current collector bias, the snap action referred to above is inevitable. The controlling current generator still calls for an increase in $I_c$, and the only way this is possible is for the collector voltage to snap from $V_{c2}$ to $V_{c2}'$. Similarly, as current is decreased from a high value to a low value, the voltage must snap from $V_{c3}$ to $V_{c3}'$ as soon as the constant-current bias becomes smaller than $I_{c3}$. Now the current-voltage relationship, in moving from $I_{c2}, V_{c2}$ to $I_{c2}, V_{c2}'$ and from $I_{c3}, V_{c3}$ to $I_{c3}, V_{c3}'$, depends upon the transient response of the entire measuring and bias circuit including the transistor. As a result, high level impulses are possible which may be sufficiently severe to permanently change or even seriously damage the transistor.

The instruments most commonly used for the display of transistor static characteristics are known as 60-cycle sweepers and XY recorders. The 60-cycle sweeper is a device for displaying one or more of the characteristic curves of the transistor under test on the screen of a cathode-ray oscilloscope. In general, either the emitter or the collector is biased from a suitable D.-C. source and the one not so biased is supplied with A.-C. through a half-wave rectifier. The potential provided from the A.-C. source varies with the instantaneous amplitude of alternate half-waves, sweeping the appropriate electrode through a wide range of potentials. The A.-C. source is often a 60-cycle source for convenience; hence, the name 60-cycle sweeper. Other frequencies, however, may be used if desired. The XY recorder, on the other hand, is a device in which curves relating potentials and currents are plotted directly on a chart by a pen which effectively has independent motion in each of two axes. By way of example, the pen may be stationary in one axis and the chart may move to provide recording on this axis.

Figure 5:
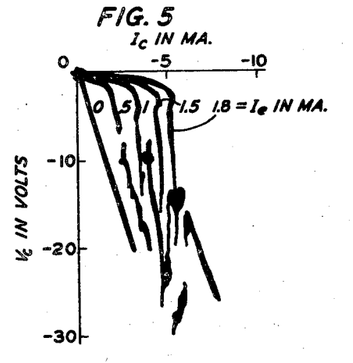
Fig. 5 represents a typical cathode-ray oscilloscope display of the collector characteristics of a VHF point-contact transistor, using the measuring circuits found in the prior art.

Static $V_c$—$I_c$ characteristics taken on a 60-cycle static characteristic sweeper, modified in accordance with the above-described feature of the invention to prevent relaxation oscillation caused by parasitic emitter-to-ground capacitance but still using constant-current emitter and collector bias supplies, are shown in Fig. 5. The transistor measured is an M1832-type VHF point-contact transistor. The transient impulses just referred to are very much in evidence. These transients are the same phenomena which were observed in earlier point-contact transistors and which were called breaks or discontinuities in the static characteristics. The reason they are so much more severe than those observed earlier is that the alpha cut-off frequency of the transistor whose static characteristics are given in Fig. 5 is in the VHF region, whereas the transistors on which these transient phenomena or breaks had been observed earlier were an order of magnitude lower in frequency response.

A principal feature of the present invention permits these transients to be avoided and the true static characteristics of the transistor obtained. The nature of this feature of the invention is demonstrated in Fig. 4A. A constant voltage or zero impedance load line has also been drawn on the curve. As shown, it intersects the $I_c$, $V_c$ curve at a single point as the load line is moved up and down the voltage axis. The characteristic may therefore be said to be short-circuit collector stable. This characterization is valid, however, only if relaxation oscillations under the conditions of a short-circuited collector are avoided. This may, for example, be accomplished by following the teachings of the feature of the invention discussed previously.

Figure 6:
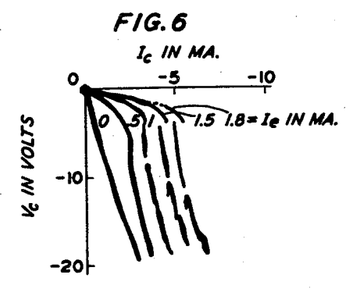
Fig. 6 shows the partial improvement in the display of Fig. 5 brought about by the use of only one of the several features of the present invention.

In general, replacing the constant-current collector bias with a constant-voltage bias supply permits the $I_c$—$V_c$ curve to be traced without transient breaks. In order to demonstrate the effectiveness of this solution, it is illustrated in two steps. First, the circuit used in obtaining the characteristics shown in Fig. 5 was modified by the single addition of a 100-micromicrofarad condenser bridged directly between the collector and base electrodes of the transistor. This made the collector load impedance low in comparison with the internal collector resistance of the transistor at frequencies above 10 megacycles and thereby reduced the gain of the transistor in the VHF region. The static curves of Fig. 5 were then repeated and the resulting curves are shown in Fig. 6. The extreme transients are now missing but small breaks or discontinuities still occur in the curves.

Figure 7:
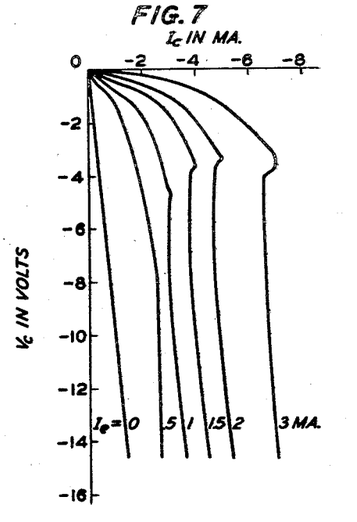
Fig. 7 shows the still greater improvement in the collector characteristic display for a transistor having negative resistance regions in its collector characteristic made possible through the use of all of the several features of the invention.

The curves shown in Figs. 5 and 6 illustrate an important principle. In order to produce an effective constant-voltage circuit, the impedance of the collector bias supply should, in accordance with the invention, be very low in comparison with the collector resistance of the transistor being measured across the entire band of frequencies at which the transistor has forward gain. The static characteristics obtained when this condition is met are shown in Fig. 7. Here, the normal constant-current collector bias supply of the prior art is replaced by a constant-voltage supply in order to assure a load impedance which is low in comparison with the collector resistance from D.-C. to the lower radio frequency region and a 1000-micromicrofarad condenser is bridged directly between the transistor collector and base to assure a low impedance facing the collector throughout the entire radio frequency range. As illustrated in Fig. 7, the resultant static characteristics are continuous and accurately trace out the negative resistance regions of the collector characteristics. The curves of Fig. 7 represent the same M1832 transistor as represented in Figs. 5 and 6 but were actually recorded on an XY recorder. However, the principles of the invention are applicable regardless of the type of recorder actually used to trace the curves.

Figure 8A:
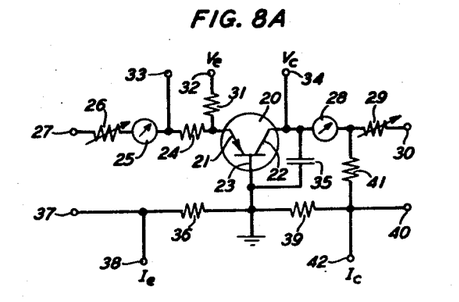
Figs. 8A through 8D illustrate several specific embodiments of the invention.

A schematic circuit diagram showing a physical embodiment of the invention is shown in Fig. 8A. The transistor 20 whose parameters are being measured has a semiconductive body, an emitter electrode 21, a collector electrode 22, and a base electrode 23. The conventional transistor symbol used shows the emitter arrow pointing into the transistor, indicating a positive direction of emitter current flow in that direction. For transistors having positive emitter current flow in the opposite direction, the circuit remains the same except that the polarities of all biasing potentials are reversed.

In the embodiment of the invention shown in Fig. 8A, base electrode 23 of transistor 20 is grounded. Emitter electrode 21 is connected through the series combination of resistance 24, a milliammeter 25 for the indication of emitter current $I_e$, and variable resistance 26 to an emitter biasing terminal 27, while collector electrode 22 is connected through the series combination of a milliammeter 28 for the indication of collector current $I_c$ and variable resistance 29 to a collector biasing terminal 30. Emitter electrode 21 is also connected through resistance 31 to a terminal 32 for the measurement of emitter voltage $V_e$. A terminal 33 is also connected to the side of resistance 24 removed from transistor 20 to show where $V_e$ could be measured if it were not desired to avoid inaccuracies caused by the flow of emitter current in resistance 24. A terminal 34 for the measurement of collector voltage $V_c$ is connected directly to collector electrode 22, and an RF bypass capacitor 35 is connected directly between collector electrode 22 and base electrode 23.

To complete the emitter biasing path, resistance 36 is connected between base electrode 23 and a second emitter biasing terminal 37. A terminal 38 for the measurement of a voltage proportional to emitter current $I_e$ is connected directly to terminal 37. On the collector side of the transistor 20, a resistance 39 is connected between base electrode 23 and a second collector biasing terminal 40. A small resistance 41 is connected from the side of milliammeter 28 removed from transistor 20 to terminal 40, and a terminal 42 for the measurement of a voltage proportional to collector current $I_c$ is also connected to terminal 40.

Figure 8B:
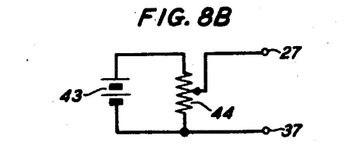
Figure 8C:
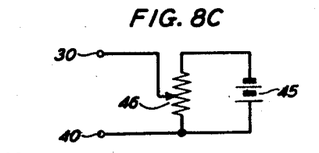

Figs. 8B and 8C show collector and emitter biasing sources, respectively, for use in connection with the circuit of Fig. 8A when the measured transistor characteristics are to be displayed by means of an XY recorder. In Fig. 8B, a battery 43, poled to bias emitter electrode 21 of transistor 20 in the forward direction, is connected across the resistance arm of a potentiometer 44. The end of the resistance arm connected to the negative terminal of battery 43, and the movable tap on potentiometer 44 are connected to emitter biasing terminals 37 and 27, respectively. Fig. 8C is similar to Fig. 8B except that it shows a battery 45, poled to bias collector electrode 22 in the reverse direction, connected across the resistance arm of a potentiometer 46. The end of the resistance arm connected to the positive terminal of battery 45, and the movable tap on potentiometer 46 are connected to collector biasing terminals 40 and 30, respectively.

Figure 8D:
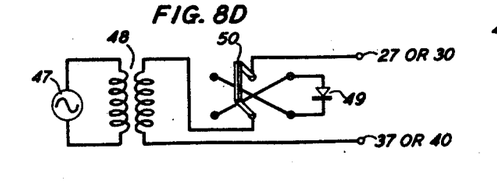

Fig. 8D shows a biasing source for use with either one or the other of the sources of Figs. 8B and 8C in the circuit of Fig. 8A when the transistor characteristics are to be displayed by means of a 60-cycle sweeper. A 60-cycle A.-C. source 47 is coupled through an isolating transformer 48 to either emitter biasing terminals 27 and 37 or collector biasing terminals 30 and 40, depending upon the transistor characteristics which it is desired to display. A diode 49 is connected in series between transformer 48 and one of the biasing terminals by means of a double-pole double-throw switch 50. Diode 49 insures that only alternate half cycles of the 60-cycle wave are applied to the transistor 20, and switch 50 permits the desired polarity to be selected.

In Fig. 8A, the parallel resistance of 24 and 31 is large enough to be at least several times higher than both the emitter and base resistances of most point-contact transistors throughout their usual operating range and are located immediately adjacent to the transistor emitter electrode 21. Resistance 24 is used to feed emitter bias current to transistor 20, while resistance 31 is provided to take off emitter potential $V_e$ when needed. Variable resistance 26 is very high in comparison with the transistor internal emitter resistance $r_e$ for all conditions of bias and is provided to assure a constant-current emitter bias and yet permit variations of emitter current. Resistance 36 is provided in series with the ground side of the emitter supply to provide a potential for measuring the magnitude of the emitter current. The potential across resistance 36 is directly proportional to $I_e$. On the collector side of transistor 20, a constant-voltage collector supply across the entire frequency range in which the transistor has forward gain is assured by the RF bypass condenser 35 connected between the collector and base electrodes and by the low values of resistances 39 and 41, which are both many times less than the transistor internal collector resistance $r_c$. The RF bypass condenser 35, it should be noted, may be connected to base electrode 23 only if the current flowing therein is negligibly small in comparison with the current in resistance 39. Otherwise, condenser 35 should be connected from collector electrode 22 to the junction of resistances 39 and 41, i.e., at the terminal 42. In general, resistances 39 and 41 cooperate with condenser 35 to insure that the biasing source for collector electrode 22 is a low impedance constant-voltage source over the entire frequency range in which transistor 20 has forward gain.

Collector potential lead 34 is taken directly off collector electrode 22 and collector current lead 42 is taken off the high potential side of resistance 39. D.-C. emitter and collector current meters 25 and 28 provide instantaneous display of these values. In general, it is required that collector current meter 28 have a sufficiently low impedance through the frequency region where RF bypass condenser 35 does not effectively short-circuit the collector so that the sum of its impedance and resistance 39 plus resistance 41 is low in comparison with the internal collector resistance $r_c$.

If one of the relatively slow response (i.e., response time measured in seconds) commercial XY recorders is used for recording static transistor characteristics, suitable collector and emitter potentials can be provided by the battery circuits illustrated in Figs. 8B and 8C. If a 60-cycle sweeping bias supply and an oscilloscopic presentation are desired, then the appropriate bias supply of Figs. 8B and 8C may be used for the fixed bias and the 60-cycle bias supply of Fig. 8D is used for the independent variable bias supply. Diode 49 in Fig. 8D is provided to open the circuit to the unwanted polarity half-cycle of the 60-cycle output of transformer 48.

In accordance with a principal feature of the present invention, a constant-voltage collector bias is substituted for a constant-current collector bias in measuring transistors having open-circuit unstable negative resistance collector regions. In general, this rules out two of the open-circuit resistances of Equations 5 through 8, namely, $r_{11}$ and $r_{21}$, as possible parameters to be measured directly. However, since it is not essential that only open-circuit resistances be chosen, two short-circuit parameters can readily be substituted for the two open-circuit ones eliminated. The two selected are shown below:

$$h_{11} = \frac{\partial V_e}{\partial I_e}\bigg] V_c = \text{constant} = r_e + (1-\alpha)r_b \quad (17)$$

$$h_{21} = \frac{\partial I_c}{\partial I_e}\bigg] V_c = \text{constant} = -\frac{r_{21}}{r_{22}} \quad (18)$$

Since the above two short-circuit parameters are directly related to the open-circuit parameters of Equations 1 through 4, as shown in Equations 17 and 18, it is possible to determine the $r_e$ of Fig. 1 and specify the transistor in terms of the equivalent circuit of Fig. 1 even though it is not convenient to measure two of these open-circuit resistances directly.

Four parameters which can be conveniently measured under stable conditions for open-circuit collector unstable point-contact transistors are, therefore, as follows:

$$h_{11} = \frac{\partial V_e}{\partial I_e}\bigg] V_c = \text{constant} \quad (19)$$

$$r_{12} = \frac{\partial V_e}{\partial I_c}\bigg] I_e = \text{constant} \quad (20)$$

$$h_{21} = \frac{\partial I_c}{\partial I_e}\bigg] V_c = \text{constant} \quad (21)$$

$$r_{22} = \frac{\partial V_c}{\partial I_c}\bigg] I_e = \text{constant} \quad (22)$$

In order to obtain the static characteristic whose slope is $h_{11}$, $V_c$ is set at the desired constant value, using collector potentiometer 46 of Fig. 8C. $I_e$ is then varied over the desired range, either by means of potentiometer 44 of Fig. 8B if an XY recorder is used or by means of the 60-cycle sweeping source of Fig. 8D if oscilloscopic presentation is to be used. With an appropriate calibration, the current axis of the recording instrument is connected to the $I_e$ terminal 38 and the properly calibrated voltage axis is connected to the $V_e$ terminal 32. As $I_e$ is varied, a stable curve of $V_e$ versus $I_e$ is then plotted, the slope of which at any point gives the magnitude of $h_{11}$ at that point. For the $r_{12}$ characteristic, $I_e$ is fixed and $I_c$ is varied, but now under the control of a low impedance constant-voltage source. The recorder or oscilloscope axes are connected to the $V_e$ and $I_c$ terminals 32 and 42 of Fig. 8A. As $I_c$ is varied, the $V_e$—$I_c$ curve is plotted and the slope of this curve is the magnitude of $r_{12}$. $r_{22}$ and $h_{21}$ are similarly obtained.

Figure 9:
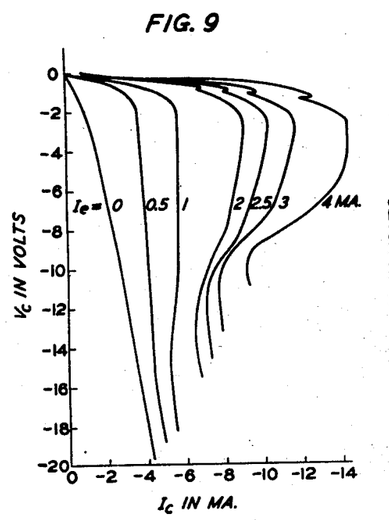
Figs. 9 and 10 show additional plots of transistor parameters having negative resistance regions which are made possible through the application of the present invention.
Figure 10:
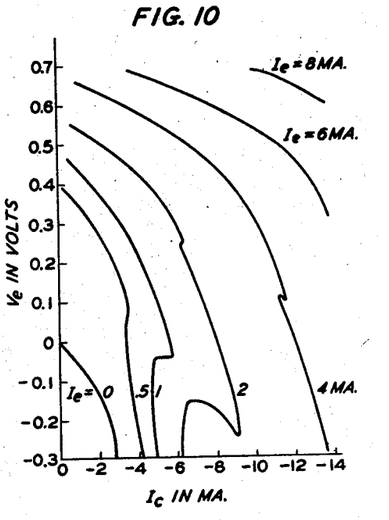

Fig. 9 illustrates the $V_c$—$I_c$ or $r_{22}$ characteristic of a VHF point-contact M1832-type transistor having numerous negative resistance regions in its collector characteristics. These curves were taken using the circuit of Fig. 8A, the biasing potentials of Figs. 8B and 8C, and an XY recorder for plotting the curves directly. It will be noted that the curves contain no discontinuities or breaks but show $I_c$ as a continuous function of $V_c$. The $r_{12}$ static characteristic curves for the same transistor plotted with the XY recorder are illustrated in Fig. 10. Here again, the curves have regions of negative resistance through which the recorder plotted the $V_e$—$I_c$ curves continuously without discontinuities or breaks. The $r_{22}$ and $r_{12}$ curves are generally the more important ones and are, therefore, the ones illustrated. $h_{11}$ and $h_{21}$ may be similarly obtained since the measuring circuit is stable for all the conditions required by the definitions of Equations 19 through 22. Actually, the two sets of curves given are usually sufficient, since the other parameters can be derived from these two sets of curves.

Figure 11:
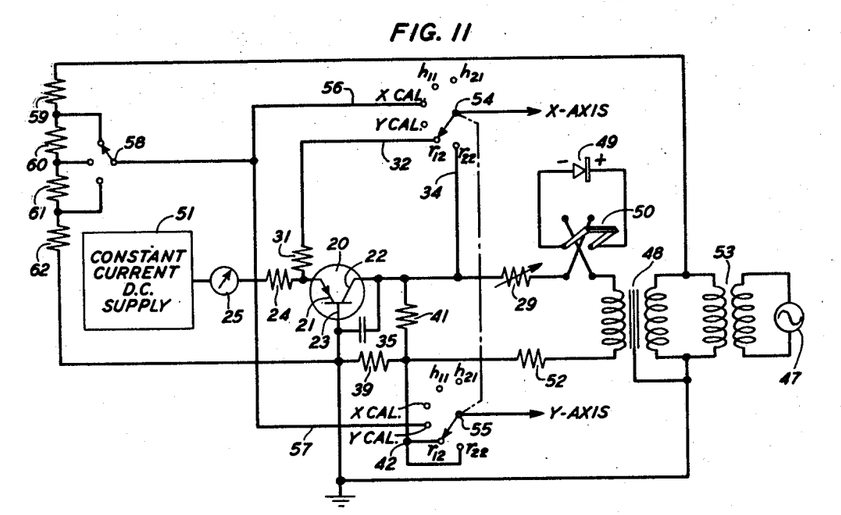
Figs. 11 and 12 represent embodiments of the invention specifically adapted to display certain transistor static characteristics on the screen of a cathode-ray oscilloscope.
Figure 12:
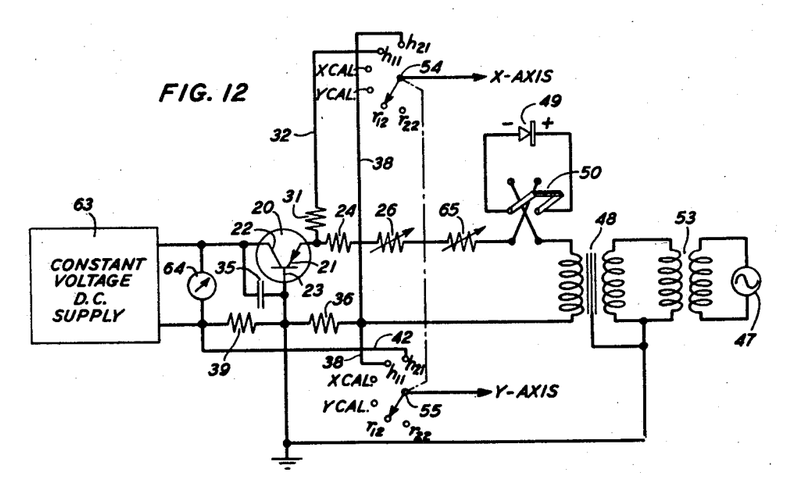

Figs. 11 and 12 are schematic diagrams of 60-cycle sweepers embodying the various features of the invention. Fig. 11 illustrates a circuit arrangement for the oscilloscope display of the $r_{12}(V_e$—$I_c)I_e$=constant and $r_{22}(V_c$—$I_c)I_e$=constant characteristics of a transistor, while Fig. 12 illustrates an arrangement for the display of the $h_{11}(V_e$—$I_c)V_c$=constant and $h_{21}(I_c$—$I_e)V_c$=constant characteristics. The two circuit arrangements may, of course, be superimposed upon each other by means of switches and comprise a single transistor parameter measuring circuit.

In the stabilized static characteristic sweeper illustrated in Fig. 11, the circuit connections are substantially the same as in Figs. 8A and 8D. Resistances 24 and 31 and condenser 35 are located as close to transistor 20 as is physically practicable for reasons which have already been set forth. Emitter electrode 21 of transistor 20 is biased in the forward direction by a constant-current D.-C. supply source 51 which, in Fig. 11, is connected directly between milliammeter 25 and ground. Collector electrode 22 is biased in the reverse direction by a constant-voltage supply source formed by resistances 39 and 41, condenser 35, and the elements connecting them to A.-C. source 47. The collector side of resistance 41 is coupled to the secondary winding of transformer 48 through variable resistance 29 and reversible diode 49, while the other side is coupled to that same winding through a resistance 52 which serves to limit the voltage on the transistor to a safe value when resistance 29 is tuned to zero resistance. One side of the primary winding of transformer 48 is grounded and the winding as a whole is coupled to A.-C. source 47 through an isolating transformer 53.

To facilitate selective oscilloscopic display of the $r_{12}$ and $r_{22}$ characteristics of transistor 20, a pair of switches 54 and 55 is provided to connect appropriate potential and current terminals of the measuring circuit through appropriate D.-C. amplifiers to the X and Y axes, respectively, of the cathode-ray oscilloscope. Switches 54 and 55 may, if desired, be ganged. When the $r_{12}$ characteristic is to be displayed, the switches connect the X and Y axes of the oscilloscope to terminals 32 and 42, respectively. When the $r_{22}$ characteristic is to be shown, the same connections are made to terminals 34 and 42, respectively.

For calibration purposes, an additional pair of terminals 56 and 57 is provided with switches 54 and 55, respectively. Both calibration terminals are connected to a switch 58 which in turn has three possible positions. Four resistances 59, 60, 61, and 62 are connected in series across the primary winding of transformer 48 with resistance 59 nearest the ungrounded side. Switch 58 connects the calibration terminals to the respective common points between these four resistances.

By way of example, the following specific values for the circuit elements in Fig. 11 may be used:

| | | |
|---|---|---|
| Resistance 24 | ohms | 3000 |
| Variable resistance 29 | do | ¹ 1000 |
| Resistance 31 | do | 3000 |
| Condenser 35 | micromicrofarads | 1000 |
| Resistance 39 | ohms | 10 |
| Resistance 41 | do | 40 |
| Resistance 52 | do | 80 |
| Resistance 59 | do | 3120 |
| Resistance 60 | do | 90 |
| Resistance 61 | do | 9 |
| Resistance 62 | do | 1 |

¹ Maximum.

Constant-current D.-C. supply 51 is variable from zero to 20 milliamperes and has an internal resistance greater than one megohm. Its current polarity is preferably reversible by switch.

In the sweeper shown in Fig. 12, the circuit connections are also much the same as in Figs. 8A and 8D. The principal difference between Figs. 11 and 12 is that in the latter, the 60-cycle sweeping source is connected to bias the emitter electrode 21 of transistor 20 instead of the collector electrode 22.

In Fig. 12, collector electrode 22 is biased in the reverse direction by a constant-voltage supply source 63 which is connected between collector electrode 22 and resistance 39. A D.-C. voltmeter 64 is connected across voltage source 63 to provide a continuous visual indication of the magnitude of the biasing potential. In the emitter biasing circuit, a second variable resistance 65 is connected in series between variable resistance 26 and diode 49 to provide additional control of the emitter biasing voltage.

The same switches 54 and 55 that are used in Fig. 11 may be used in the static characteristic sweeper circuit illustrated in Fig. 12. When the $h_{11}$ characteristic of transistor 20 is to be displayed, the switches connect the X and Y axes of the oscilloscope to terminals 32 and 38, respectively. When the $h_{21}$ characteristic is to be shown, the same connections are to be made to terminals 38 and 42, respectively.

By way of example, the following specific values for the circuit elements in Fig. 12 may be used:

| | | |
|---|---|---|
| Resistance 24 | ohms | 3000 |
| Variable resistance 26 | do | ¹ 100,000 |
| Resistance 31 | do | 3000 |
| Condenser 35 | micromicrofarads | 1000 |
| Resistance 36 | ohms | 10 |
| Resistance 39 | do | 10 |
| Variable resistance 65 | megohm | ¹ 1 |

¹ Maximum.

Constant-voltage D.-C. source 63 is varied from zero to 100 volts and has an internal resistance less than 100 ohms. Its voltage polarity is reversible by switch.

Figure 13:
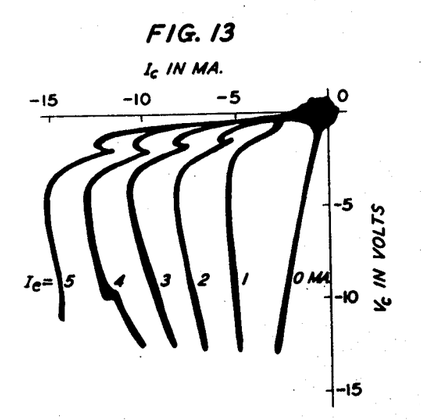
Figs. 13 and 14 illustrate cathode-ray oscilloscope displays of transistor parameters produced by the apparatus shown in Fig. 11.
Figure 14:
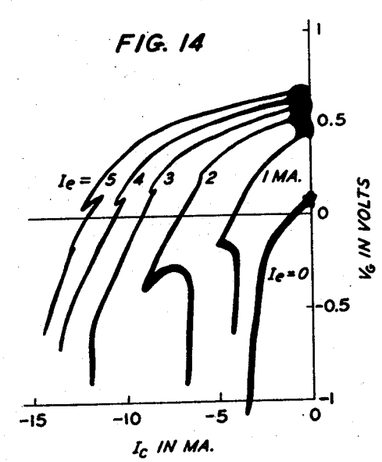

The sweepers illustrated in Figs. 11 and 12 can be used to obtain all four characteristics defined in Equations 19 through 22. Fig. 13 gives the $r_{22}$ and Fig. 14 gives the $r_{12}$ static characteristics taken with these 60-cycle sweepers for the same M1832-type transistor whose $r_{22}$ and $r_{12}$ characteristics, taken on an XY recorder, are shown in Figs. 9 and 10, respectively.

All of the circuits which have been described are given to illustrate the principles of the present invention governing the proper choice of transistor termination for stable measurements of the parameters of transistors which are potential relaxation oscillators and/or which have negative resistance regions in their collector characteristics. The important consideration is that bias and signal sources be used which have impedances for which the complete measuring circuit is stable. The actual bias supplies shown in Figs. 8B and 8C tend to be inefficient in that a very high emitter battery voltage is necessary to assure a sufficiently high emitter bias impedance, and a very high collector battery current is needed to assure a sufficiently low collector bias impedance. Better and more convenient high impedance emitter and low impedance collector supplies may be obtained electronically by the use of either transistors or vacuum tubes combined with negative feedback in the manner well known in the art. In the interest of simplicity, they are not presented here since they are not necessary to illustrate the principles of the invention pertaining to proper termination for stabilized measurements.

The preceding discussion has been based upon the use of static characteristic curve tracers to illustrate the principles of the invention. These principles are not limited to static characteristic curve tracers, however, but apply to all parameter measurements, including direct reading "r" measuring sets, alpha sweepers, and the like. Consider the direct reading measurement of $r_{12}$, for example. The D.-C. biases for the transistor are fixed by means of a constant-current emitter supply and a constant-voltage collector supply. An A.-C. signal generator is used to produce a small A.-C. excursion of $I_c$ about the fixed operating point. This A.-C. signal generator should, in accordance with the principles of the present invention, be a constant-voltage generator. The $\Delta I_c$ variation is read as an A.-C. voltage across a low resistance such as resistance 39 of Fig. 8A. The important consideration is that the impedance seen by collector electrode 22 of transistor 20 looking into the D.-C. bias supply, the A.-C. signal generator, and the current resistance 39 be low not only at D.-C. and the signal frequency but at all frequencies at which the transistor being measured has gain. The resultant $V_e$ variation $\Delta V_e$ is measured as an A.-C.

voltage by a high impedance voltmeter at a point comparable to terminal 32 in Fig. 8A. Here again, it is important to insure that the impedance facing the transistor emitter electrode 22 is as high as possible, not only at D.C. and the signal frequency, but at all frequencies at which the transistor has gain. $r_{12}$ is then given by the the ratio of $\Delta V_e$ to $\Delta I_c$.

Although the preceding discussion has been limited to point-contact transistors having alphas greater than unity and/or having negative resistance regions in their collector characteristics, the parameter measurements of Equations 19 through 22 are preferable to those of Equations 5 through 8 for high resistance collector point-contact transistors without negative resistance regions and for the very high resistance collector junction transistors. Such units are not unstable with high impedance collector terminations but place severe requirements on a constant-current collector source because of their high collector resistance. Furthermore, although stable, they tend to be extremely sensitive to minute disturbances such as contact noise in the measuring circuits. Finally, the above discussion has been largely restricted to open-circuit emitter, short-circuit collector terminated units. Transistors have been encountered which are both open-circuit and short-circuit unstable throughout certain regions of their collector characteristic. While these units are often unsatisfactory for other reasons, they serve to illustrate an important principle. A terminating impedance intermediate between an open-circuit and short-circuit may be found for which such a unit is stable in the region of simultaneous open- and short-circuit instability. If this termination is used, stable measurements can be made in this region.

It is to be understood that the above-described arrangements are illustrative of the application of the principles of the invention. Numerous other arrangements may be devised by those skilled in the art without departing from the spirit and scope of the invention.

What is claimed is:

1. In combination, a transistor having a semiconductive body, an emitter electrode, a collector electrode, and a base electrode, means including a source of direct potential connected between said emitter and base electrodes to bias said emitter electrode in the forward direction, the externally connected impedance between said emitter and base electrodes being many times larger than the internal D.-C. emitter and base resistances of said transistor, and means including a source of direct potential connected between said collector and base electrodes to bias said collector electrode in the reverse direction, the externally connected impedance between said collector and base electrodes being many times smaller than the internal D.-C. collector resistance of said transistor.

2. In combination, a transistor having a semiconductive body, an emitter electrode, a collector electrode, a base electrode, and negative resistance regions in its collector-current versus collector-voltage characteristics, and means to bias said transistor without encountering instability in said negative resistance regions which comprises means including a source of direct potential connected between said emitter and base electrodes to bias said emitter electrode in the forward direction, the externally connected impedance between said emitter and base electrodes being substantially infinite with respect to the internal D.-C. emitter and base resistances of said transistor, and means including a source of direct potential connected between said collector and base electrodes to bias said collector electrode in the reverse direction, the externally connected impedance between said collector and base electrodes being substantially infinitesimal with respect to the internal D.-C. collector resistance of said transistor.

3. In combination, a transistor having a semiconductive body, an emitter electrode, a collector electrode, a base electrode, and a current amplification factor greater than unity, means including a source of direct potential connected between said emitter and base electrodes to bias said emitter electrode in the forward direction, the externally connected impedance between said emitter and base electrodes being many times larger than the internal D.-C. emitter and base resistances of said transistor, a resistance at least several times greater than the internal A.-C. emitter and base resistances of said transistor connected immediately adjacent to said emitter electrode in series between said emitter electrode and said source of direct potential to prevent said transistor from generating relaxation oscillations, and means including a source of direct potential connected between said collector and base electrodes to bias said collector electrode in the reverse direction, the externally connected impedance between said collector and base electrodes being many times smaller than the internal D.-C. collector resistance of said transistor.

4. In combination, a transistor having a semiconductive body, an emitter electrode, a collector electrode, a base electrode, negative resistance regions in its collector-current versus collector-voltage characteristics, and a current amplification factor greater than unity, means including a source of direct potential connected between said emitter and base electrodes to bias said emitter electrode in the forward direction, the externally connected impedance between said emitter and base electrodes being substantially infinite with respect to the internal D.-C. emitter and base resistances of said transistor, a resistance at least several times greater than the internal A.-C. emitter and base resistances of said transistor connected immediately adjacent to said emitter electrode in series between said emitter electrode and said source of direct potential, whereby said transistor is prevented from generating relaxation oscillations, and means including a source of direct potential connected between said collector and base electrodes to bias said collector electrode in the reverse direction, the externally connected impedance between said collector and base electrodes being substantially infinitesimal with respect to the internal D.-C. collector resistance of said transistor.

5. In combination, a transistor having a semiconductive body, an emitter electrode, a collector electrode, and a base electrode, means including a source of direct potential connected between said emitter and base electrodes to bias said emitter electrode in the forward direction, the externally connected impedance between said emitter and base electrodes being many times greater than the internal D.-C. emitter and base resistances of said transistor over the entire frequency range in which said transistor has gain, and means including a source of direct potential connected between said collector and base electrodes to bias said collector electrode in the reverse direction, the externally connected impedance between said collector and base electrodes being many times less than the internal D.-C. collector resistance of said transistor over the entire frequency range in which said transistor has gain.

6. In an arrangement for measuring the electrical characteristics of a transistor having a semiconductive body, an emitter electrode, a collector electrode, and a base electrode, means including a source of direct potential connected between said emitter and base electrodes to bias said emitter electrode in the forward direction, the externally connected impedance between said emitter and base electrodes being large in comparison with the internal D.-C. emitter and base resistances of said transistor, and means including a source of direct potential connected between said collector and base electrodes to bias said collector electrode in the reverse direction, the externally connected impedance between said collector and base electrodes being small in comparison with the internal D.-C. collector resistance of said transistor, whereby unstable measuring conditions which any negative resistance regions in the collector-current versus collector-voltage characteristics of said transistor would otherwise tend to produce are avoided.

7. In an arrangement for measuring the electrical characteristics of a transistor having a semiconductive body, an emitter electrode, a collector electrode, a base electrode, and negative resistance regions in its collector-current versus collector-voltage characteristics, means including a source of direct potential connected between said emitter and base electrodes to bias said emitter electrode in the forward direction, the externally connected impedance between said emitter and base electrodes being many times greater than the internal D.-C. emitter and base resistances of said transistor over the entire frequency range in which said transistor has gain, and means including a source of direct potential connected between said collector and base electrodes to bias said collector electrode in the reverse direction, the externally connected impedance between said collector and base electrodes being many times less than the internal D.-C. collector resistance of said transistor over the entire frequency range in which said transistor has gain, whereby unstable measuring conditions which said negative resistance regions might otherwise tend to produce are avoided.

8. In an arrangement for measuring the electrical characteristics of a transistor having a semiconductive body, an emitter electrode, a collector electrode, a base electrode, and negative resistance regions in its collector-current versus collector-voltage characteristics, means including a source of direct potential connected between said emitter and base electrodes to bias said emitter electrode in the forward direction, the externally connected impedance between said emitter and base electrodes being many times greater than the internal D.-C. emitter and base resistances of said transistor, means including a source of direct potential connected between said collector and base electrodes to bias said collector electrode in the reverse direction, the externally connected impedance between said collector and base electrodes being many times less than the internal D.-C. collector resistance of said transistor, and a capacitor having an impedance many times less than the internal D.-C. collector resistance of said transistor at radio frequencies connected immediately adjacent said transistor between said collector and base electrodes, whereby said capacitor helps maintain the impedance presented to said collector electrode by said last-mentioned means at a level many times less than the internal D.-C. collector resistance of said transistor in the upper portions of the frequency range in which said transistor has gain and unstable measuring conditions which said negative resistance regions might otherwise tend to produce are avoided.

9. In an arrangement for measuring the electrical characteristics of a transistor having a semiconductive body, an emitter electrode, a collector electrode, a base electrode, and a current amplification factor greater than unity, means including a first source of direct potential connected between said emitter and base electrodes to bias said emitter electrode in the forward direction, means including a second source of direct potential connected between said collector and base electrodes to bias said collector electrode in the reverse direction, a first resistance at least several times greater than the internal A.-C. emitter and base resistances of said transistor connected immediately adjacent to said emitter electrode in series between said emitter electrode and said first source of direct potential, whereby said transistor is prevented from generating relaxation oscillations, a terminal for the measurement of the voltage appearing between said emitter and base electrodes, and a second resistance at least several times greater than the internal A.-C. emitter and base resistances of said transistor connected immediately adjacent said emitter electrode in series between said emitter electrode and said terminal, whereby the voltage appearing between said emitter and base electrodes may be measured at said terminal without error due to the flow of emitter current through said first resistance.

10. In an arrangement for measuring the electrical characteristics of a transistor having a semiconductive body, an emitter electrode, a collector electrode, a base electrode, and a current amplification factor greater than unity, means including a first source of direct potential connected between said emitter and base electrodes to bias said emitter electrode in the forward direction, the externally connected impedance between said emitter and base electrodes being substantially infinite with respect to the internal D.-C. emitter and base resistances of said transistor, means including a second source of direct potential connected between said collector and base electrodes to bias said collector electrode in the reverse direction, the externally connected impedance between said collector and base electrodes being substantially infinitesimal with respect to the internal D.-C. collector resistance of said transistor, whereby unstable measuring conditions which any negative resistance regions in the collector-current versus collector-voltage characteristics of said transistor would otherwise tend to produce are avoided, a first resistance at least several times greater than the internal A.-C. emitter and base resistances of said transistor connected immediately adjacent to said emitter electrode in series between said emitter electrode and said first source of direct potential, whereby said transistor is prevented from generating relaxation oscillations, a terminal for the measurement of the voltage appearing between said emitter and base electrodes, and a second resistance at least several times greater than the internal A.-C. emitter and base resistances of said transistor connected immediately adjacent to said emitter electrode in series between said emitter electrode and said terminal, whereby the voltage appearing between said emitter and base electrodes may be measured at said terminal without error due to the flow of emitter current through said first resistance.

11. In an arrangement for measuring the electrical characteristics of a point-contact transistor having a semi-conductive body, an emitter electrode, a collector electrode, a base electrode, and negative resistance regions in its collector-current versus collector-voltage characteristics, means including a first source of direct potential connected between said emitter and base electrodes to bias said emitter electrode in the forward direction, the externally connected impedance between said emitter and base electrodes being many times greater than the internal D.-C. emitter and base resistances of said transistor over the entire frequency range in which said transistor has gain, means including a second source of direct potential connected between said collector and base electrodes to bias said collector electrode in the reverse direction, the externally connected impedance between said collector and base electrodes being many times less than the internal D.-C. collector resistance of said transistor over the entire frequency range in which said transistor has gain, whereby unstable measuring conditions which said negative resistance regions might otherwise tend to produce are avoided, a first resistance at least several times greater than the internal A.-C. emitter and base resistances of said transistor connected immediately adjacent to said emitter electrode in series between said emitter electrode and said first source of direct potential, whereby said transistor is prevented from generating relaxation oscillations, an emitter voltage terminal for the measurement of the voltage appearing between said emitter and base electrodes, a second resistance at least several times greater than the internal A.-C. emitter and base resistances of said transistor connected immediately adjacent to said emitter electrode in series between said emitter electrode and said emitter voltage terminal, whereby the voltage appearing between said emitter and base electrodes may be measured at said emitter voltage terminal without error due to the flow of emitter current through said first resistance, a third resistance many times smaller than the internal D.-C. collector resistance of said transistor connected in series with said second source of direct potential between said collector and base electrodes, and a collector current terminal for the measurement of the flow of collector current in said transistor connected to one side of said third resistance, whereby the voltage developed across said third resistance and appearing at said collector-current terminal is proportional to the collector current flowing in said transistor.

12. In a measuring arrangement in accordance with claim 11, a capacitor having an impedance many times less than the internal D.-C. collector resistance of said transistor at radio frequencies connected immediately adjacent said transistor between said collector and base electrodes to assist in maintaining the impedance presented to said collector electrode by said second source of direct potential at a level many times less than the internal D.-C. collector resistance of said transistor in the upper portions of the frequency range in which said transistor has gain.

13. In a measuring arrangement in accordance with claim 11, a fourth resistance connected in series with said first source of direct potential between said emitter and base electrodes and an emitter-current terminal for the measurement of the flow of emitter current in said transistor connected to one side of said fourth resistance, whereby the voltage developed across said fourth resistance and appearing at said emitter-current terminal is proportional to the emitter current flowing in said transistor.

14. In a measuring arrangement in accordance with claim 11, a collector-voltage terminal for the measurement of the voltage appearing between said collector and base electrodes connected to said collector electrode.

References Cited in the file of this patent

"Production Tester for Transistors," Hunter et al., Electronics, October 1950, pages 96–99.

"Principles of Transistor Circuits," Richard F. Shea, copyright 1953, by John Wiley & Sons, Inc., New York, pages 97–131, 485–507.

"Cathode-Ray Tube Plots, Transistor Curves," Kurshaw et al., Electronics, February 1953, pages 122–127.